United States Patent
Nelson et al.

(10) Patent No.: US 8,175,850 B2
(45) Date of Patent: May 8, 2012

(54) MONITORING SYSTEM WITH DYNAMICALLY CONFIGURABLE NON-INTERFERING SIGNAL PROCESSING

(75) Inventors: Matthew Allen Nelson, Gardnerville, NV (US); Dustin Delany Hess, Carson City, NV (US); Summer Woodson, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 603 days.

(21) Appl. No.: 12/323,599

(22) Filed: Nov. 26, 2008

(65) Prior Publication Data

US 2010/0131242 A1    May 27, 2010

(51) Int. Cl.
*G06F 11/30*    (2006.01)
*G06F 19/00*    (2006.01)
*G21C 17/00*    (2006.01)
*G05B 9/02*    (2006.01)

(52) U.S. Cl. .......... 702/189; 700/79; 700/143; 702/182; 702/183; 702/187

(58) Field of Classification Search .............. 702/189, 702/187, 182, 183; 700/79, 143
See application file for complete search history.

(56) References Cited

U.S. PATENT DOCUMENTS

| | | | | |
|---|---|---|---|---|
| 6,041,287 A * | 3/2000 | Dister et al. | | 702/182 |
| 2004/0148130 A1* | 7/2004 | Scott et al. | | 702/183 |
| 2005/0159922 A1* | 7/2005 | Hsiung et al. | | 702/182 |
| 2006/0020423 A1* | 1/2006 | Sharpe | | 702/183 |
| 2008/0183863 A1 | 7/2008 | Hess et al. | | |

OTHER PUBLICATIONS

Polke et al., Process Control Engineering, Jun. 15, 2000, Ullmann's Encyclopedia of Industrial Chemistry, pp. 110,111,221,241-244.*
GE Energy, "3500 Series Machinery Protection System", retrieved from: http://www.ge.energy.com/prod_serv/products/oc/en/bently_nevada/3500series_mps.htm, Nov. 19, 2008, 2 pages.
GE Energy, "3500 Series Machinery Protection System", Bently Nevada Asses Condition Monitoring, Nov. 2006, GEA-13965 Rev. A, 12 pages.
GE Energy, "3500 System Overview", Bently Nevada Asses Condition Monitoring, Copyright 2002, Rev. F, Mar. 2007, Part No. 162096-01, pp. 1 of 12.
GE Energy, "3500 Software", Bently Nevada Asses Condition Monitoring, Copyright 1999, Rev. C, Mar. 2007, Part No. 141527-01, pp. 1 of 4.
GE Energy, "3500/22M Transient Data Interface", Bently Nevada Asses Condition Monitoring, Copyright 2002, Rev. E, Jan. 2007, Part No. 161581-01, pp. 1 of 8.
GE Energy, "3500/42M Proximitor/Seismic Monitor", Bently Nevada Asses Condition Monitoring, Copyright 1999, Rev. F, Mar. 2007, Part No. 143694-01, pp. 1 of 18.

* cited by examiner

*Primary Examiner* — Janet Suglo
(74) *Attorney, Agent, or Firm* — Hoffman Warnick LLC; Andrew Hess

(57) ABSTRACT

A monitoring system with dynamically configurable non-interfering signal processing is disclosed. In one aspect, data relating to the management of the operation of a machine and data relating to the safety protection of the machine are combined in a non-interfering manner.

20 Claims, 4 Drawing Sheets

```xml
<object type="Direct" name="RadialVibration2.Direct">

<property type="TopScale" value="20"/>
  <property type="BottomScale" value="0"/>
  <property type="Unit" value="mil"/>
  <property type="SubUnit" value="pp"/>
  <property type="HighPassCorner" value="12"/>
  <property type="HighPassPoles" value="23"/>
  <property type="LowPassCorner" value="10"/>
  <property type="LowPassPoles" value="34"/>

<reference type="HasComponent"/>
       <object type="StaticVariable" name="Direct2.Variable">
         <property type="ScaleFactor" value="1"/>
         <property type="UpdateRate" value="0.02"/>
         <reference type="DestinationFor" target="Direct2.LP2"/>
       </object>

<object type="LowPassFilter" name="Direct2.LP2">
         <property type="Poles" value="1"/>
         <property type="CornerFrequency" value="0.3"/>
         <reference type="DestinationFor" target="Direct.PK"/>
       </object>

<object type="PeakDetector" name="Direct2.PK">
         <property type="PeakDetectorType" value="1"/>
         <property type="AttackRate" value="2400"/>
         <property type="DecayRate" value="4.0"/>
         <reference type="DestinationFor" target="Direct2.HP"/>
       </object>

<object type="HighPassFilter" name="Direct2.HP">
         <property type="Poles" value="1"/>
         <property type="CornerFrequency" value="4.0"/>
         <reference type="DestinationFor" target="Direct2.LP"/>
       </object>

<object type="LowPassFilter" name="Direct2.LP2">
         <property type="Poles" value="1"/>
         <property type="CornerFrequency" value="4000"/>
         <reference target="PhysicalChannel_1_1" type="DestinationFor"/>
       </object>
     </reference>
</object>
```

MONITORING SYSTEM WITH DYNAMICALLY CONFIGURABLE NON-INTERFERING SIGNAL PROCESSING

BACKGROUND OF THE INVENTION

The present invention relates generally to monitoring machines and more particularly to using a dynamic signal processing configuration to monitor measurements associated with the management of a machine and measurements associated with the safety protection.

In the field of industrial equipment monitoring and control, monitored machine components may generate various signals representative of dynamic machine conditions. Signal-generating components such as sensors and transducers are typically positioned on or otherwise closely associated with points of interest of the machine. A portion of these signals and a subset of data analysis that is performed on these signals are used to determine safety critical machine performance. Actions taken on this data may include machine shut-down or a change in operating conditions of the machine that are necessary to prevent catastrophic loss of life, environmental damage, or financial loss. Another portion of these signals and subset of data analysis are used to manage the use of the machine. For example, this information may be used to schedule machine repair outages or to alter machine operating conditions to maximize performance, efficiency, or machine life.

Typically, a variety of machine conditions arise in a machine that necessitates the alteration of data that is used to manage the use of the machine. Alterations may include changing the sample rates and filtering to add or remove frequency content, changing the frequency that data samples are collected, or changing whether the data is integrated or not. An alteration could also arise if an operator of the machine needs to add a measurement or dynamic waveform display to further analyze the health of the machine.

In contrast to data used to manage the operation of a machine, data associated with the safety protection of the machine are typically based on machine physical parameters such as bearing clearances, and are changed infrequently. In addition, because of the safety criticality of these protection measurements, availability and reliability are of utmost importance. Also, the control over these different data sets may reside with different individuals within the plant. For example, measurements associated with the safety protection of the machine may be the responsibility of the plant operations, whereas the data associated with the management of the use of the machine may be the responsibility of the plant reliability group. Generally, the operations group needs confidence that the reliability group cannot impact production and the reliability group needs confidence that their actions will not impact production.

Because of these differences between measurements associated with the safety protection of the machine and measurements associated with the management of the use of the machine, it is desirable to separate the signal processing functions of these measurements. Unfortunately, none of the existing approaches are optimal. For example, one approach is to provide separate signal processing hardware devices with one hardware device assigned to processing data associated with the safety protection measurements and a second hardware device that processes data associated with management of the machine. This approach adds significant complexity and cost as measurements needed for protection and management must be produced in both hardware devices or else communicated between the two devices. In another approach, only a limited amount of management data derived from the protection data is used. For example, if the protection data is generated from a Fast Fourier Transform, then a user of the management data may have access to the complete transform and the raw data feeding into the transform. However, the management data user cannot add more waveforms or significantly alter the data sampling without affecting the protection measurements.

BRIEF DESCRIPTION OF THE INVENTION

In one aspect of the present invention, there is a system for monitoring a machine. The system comprises at least one sensor located about the machine that generates signals representative of a machine condition. A monitoring module monitors the signals generated from the at least one sensor. The monitoring module comprises a first level signal processing component that generates a plurality of waveforms from the signals generated from the at least one sensor. Each of the plurality of waveforms provides different frequency information of the signals. There is a second level signal processing component that comprises a plurality of signal processing blocks that are dynamically configurable to be linked to form at least one data path that defines a signal processing operation to be performed on at least one waveform selected from the plurality of waveforms generated from the first level signal processing component to determine at least one measurement relating to the management of the operation of the machine and at least one data path that defines a signal processing operation to be performed on at least one waveform selected from the plurality of waveforms generated from the first level signal processing component to determine at least one measurement relating to the safety protection of the machine. Configurability of measurements relating to the management of the operation of the machine is independent and non-interfering with configurability of measurements relating to the safety protection of the machine.

In a second aspect of the present invention, there is a method for monitoring a machine. The method comprises: obtaining raw data representative of a condition occurring at a machine; generating a plurality of waveforms from the raw data, wherein each of the plurality of waveforms depict a visual representation having different frequency information of the raw data; and dynamically configuring a plurality of signal processing blocks to be linked to form at least one data path that defines a signal processing operation to be performed on at least one waveform selected from the plurality of waveforms to determine at least one measurement relating to the management of the operation of the machine and at least one measurement relating to the safety protection of the machine, without interfering with signal processing blocks used in other data paths that determine measurements relating to the management of the operation of the machine and other data paths that determine measurements relating to the safety protection of the machine.

In a third aspect of the present invention, there is a tangible-readable medium that stores instructions, which when executed, enables a processor to monitor a machine. The instructions causes the processor to perform actions that comprises: obtaining signals representative of a machine condition; generating a plurality of waveforms from the signals, wherein each of the plurality of waveforms provides different frequency information of the signals; and dynamically configuring a plurality of signal processing blocks to be linked to form at least one data path that defines a signal processing operation to be performed on at least one waveform selected from the plurality of waveforms to determine at least one measurement relating to the management of the operation of the machine and at least one measurement relating to the safety protection of the machine, without interfering with signal processing blocks used in other data paths that determine measurements relating to the management of the operation of the machine and other data paths that determine measurements relating to the safety protection of the machine.

BRIEF DESCRIPTION OF THE DRAWINGS

FIG. 4 is an example of an Extensible Markup Language (XML) file used to define the signal processing operation depicted in FIG. 3.

DETAILED DESCRIPTION OF THE INVENTION

At least one embodiment of the present invention is described below in reference to its application in connection with and operation of monitoring data generated from an industrial machine system. A non-exhaustive listing of possible industrial machine systems that are suitable for use with embodiments of the present invention include rotary machines, reciprocating machines and machine systems that are fixed. However, it should be apparent to those skilled in the art and guided by the teachings herein that the present invention is likewise applicable to any machinery of varying complexity where there is a need to monitor operation of data generated therefrom, such as for example, machines employed in assembly lines, production equipment, material handling equipment, and power generation equipment. A non-exhaustive listing of data that may be monitored from the above-noted machines includes vibration, temperature, pressure and other high-speed events that may occur with the machines.

Figure 1:
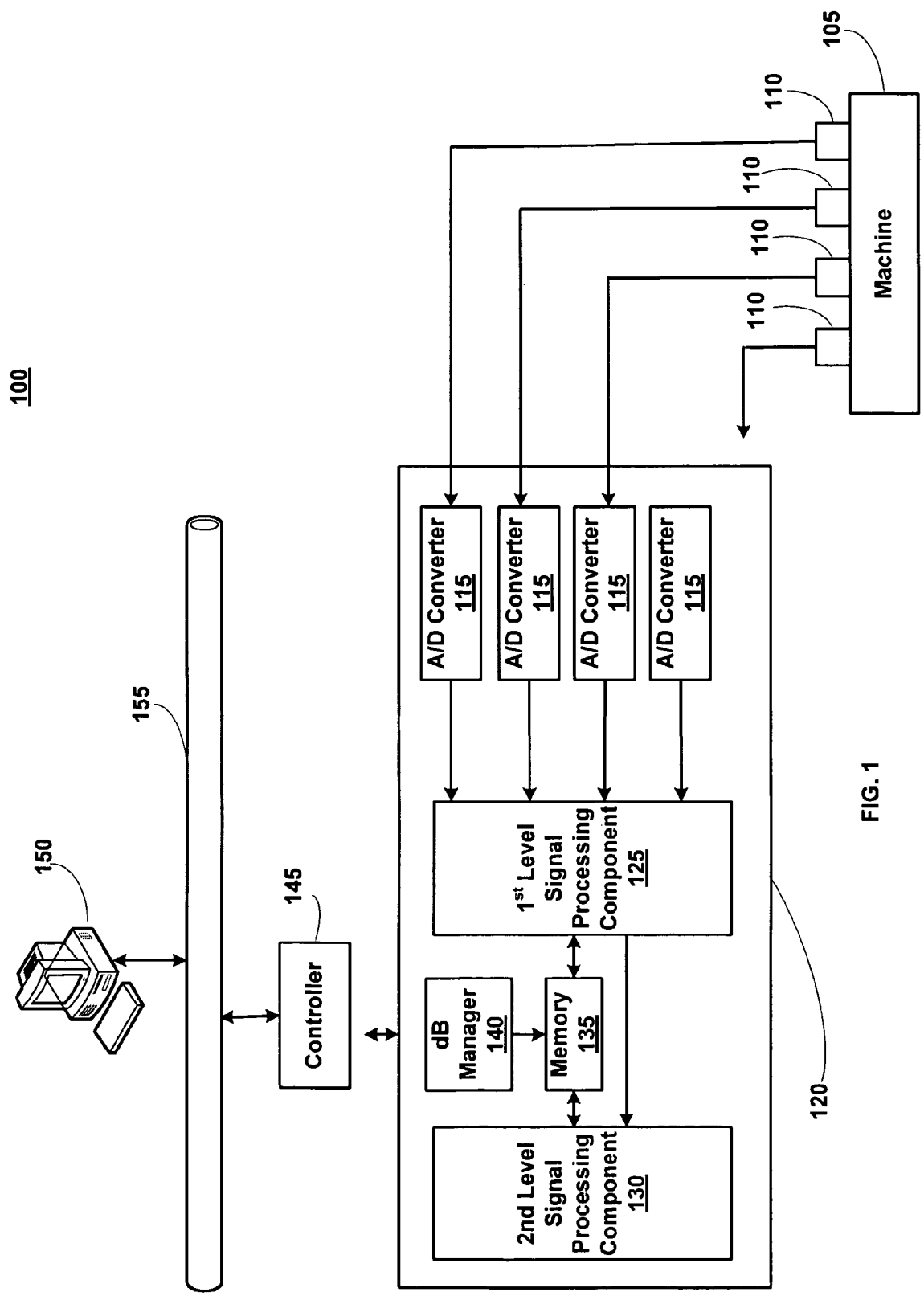
FIG. 1 is a schematic illustration of a monitoring system according to one embodiment of the present invention.

Referring to the drawings, FIG. 1 is a schematic illustration of a monitoring system 100 that monitors a machine 105 according to one embodiment of the present invention. The monitoring system 100 includes a plurality of sensors 110 located about machine 105. Sensors 110 may include any type of sensor or transducer that may acquire dynamic data that pertains to the condition of machine 105 such as an accelerometer, temperature sensor and pressure sensor that sense for vibration, temperature and pressure, respectively. Although FIG. 1 shows sensors 110 attached to machine 105 in a wired configuration, those skilled in the art will recognize that sensors 110 can acquire dynamic data from machine 105 by wireless, electromagnetic or fiber optic modalities. The dynamic data acquired by sensors 110 is generally raw data obtained in analog signal form over a very large bandwidth that contains large quantities of information pertaining to machine 105 that can be extracted to provide information with respect to the operation and protection of machine 105.

After sensing and acquiring the dynamic data in analog signal form, each sensor 110 transmits analog signals containing the dynamic data to monitoring module 120 and to a respective analog-to-digital (A/D) converter 115 that converts the signals generated from the at least one sensor to sampled digital signals. A/D converters 115 may take the form of hardware devices, software, or a combination of hardware and software that are configured to perform the analog-to-digital signal conversion.

A first level signal processing component 125 within monitoring module 120 receives the sampled digital signals from A/D converters 115 and monitors the signals generated from sensors 110 to manage data associated with the operation of machine 105 and data associated with the safety protection of machine 105. First level signal processing component 125 generates a plurality of waveforms from the signals generated from sensors 110 that have been digitized by A/D converters 115. Each of the plurality of waveforms provides different frequency information of the signals generated by sensors 110. In particular, as explained below in more detail with reference to FIG. 2, first level signal processing component 125 uses dynamic waveform decimation and filtering and sample rate synchronization to an external timing signal to generate a multitude of waveforms having different sample rates and frequency spans from the dynamic data generated from sensors 110. First level signal processing component 125 may also perform signal diagnostics such as linear range checks, signal slew rate checks, or bias voltage checks. First level signal processing component 125 may be one of a number of programmable devices that may be programmed to perform functions such as dynamic waveform decimation and filtering and sample rate synchronization to an external timing signal. In particular, first level signal processing component 125 may be a programmable device selected from the group consisting of a field programmable gate array (FPGA), a programmable logic device (PLD), a complex programmable logic device (CPLD), an application specific integrated circuit (ASIC) and a processor.

Referring again to FIG. 1, monitoring module 120 further includes a second level signal processing component 130 that performs signal processing operations on any number of waveforms generated from first level signal processing component 125. These signal processing operations generally result in measurements that relate to the management of the operation of machine 105 and measurements that relate to the safety protection of the machine. In one embodiment, second level signal processing component 130 comprises a plurality of signal processing blocks that are dynamically configurable to be linked to form at least one data path that defines a signal processing operation to be performed on at least one waveform selected from the plurality of waveforms generated from first level signal processing component 125. In particular, second level signal processing component 130 is configured to map the selected waveform(s) from the waveforms generated from first level signal processing component 125 to selected signal processing blocks that define the at least one data path. Each data path comprised of these signal processing blocks results in at least one measurement that may relate to the management of the operation of machine 105 and/or to the safety protection of machine 105. These signal processing blocks are dynamically configured because the blocks can be modifiable such that changes made to signal processing blocks in one data path do not interfere with signal processing blocks used in other data paths. Examples of changes include adding signal processing blocks to a data path, deleting signal processing blocks from a data path and altering signal processing blocks in a data path to generate another type of measurement. This feature is especially helpful because it is desirable to have the capability to make changes to signal processing blocks that determine measurements that relate to the management of the operation of machine 105 without interfering with data paths that determine measurements relating to safety protection of the machine 105 and vice versa. In one embodiment, second level signal processing component 130 comprises a processor such as a signal processor or a microprocessor that is configured to execute the dynamically configured signal processing blocks. Below is a more detail explanation of the dynamically configured signal processing blocks as used in embodiments of the present invention.

FIG. 1 further shows that monitoring module 120 includes memory 135 which is configured to store measurements in predefined memory locations as allocated by a database (dB) manager 140. These measurements relate to the management of the operation of machine 105 and the safety protection of machine 105. In particular, memory 135 stores the waveforms generated from first level signal processing component 125, the dynamically configurable plurality of signal processing blocks utilized by second level signal processing component 130 and the measurements that relate to the management of the operation of machine 105 and measurements that relate to the safety protection of the machine 105 as determined by second level signal processing component 130. Those skilled in the art will recognize that memory 135 can store additional information such as rules for collecting dynamic data and transmitting measurements from monitoring module 120 for additional diagnostics.

Monitoring system 100 as shown in FIG. 1 may include a controller 145 that is in signal communication with monitoring module 120 to make adjustments to machine 105 and transmit output data from monitoring module 120 to a computing unit 150 via a network 155. The signal communication between controller 145 and monitoring module 120 may be made via electrical, electromagnetic, or fiber-optical connection. Controller 145 may be any known control system such as a programmable logic controller (PLC) or a distributed control system (DCS). In one embodiment of operation, controller 145 uses the optimized setpoints included in output data generated from monitoring module 120 to make adjustments to machine 105. The signal communication between controller 145 and computing unit 150 via network 155 may be made via electrical, electromagnetic, or fiber-optical connection. In another embodiment, monitoring system 100 functions as an independent safety system and can return machine 105 to a safe operating condition independently of controller 145.

The computing unit 150 is also in communication with the network 155 via a wired or wireless electrical, electromagnetic, or fiber-optical connection. Computing unit 150, which may be any type of server or computer, is located remotely of the controller 145, monitoring module 120, sensors 110, and machine 105. Data can be both received by computing unit 150 from controller 145, and transmitted from the computing unit 150 to controller 145.

In one embodiment, computing unit 150, which may be transportable (e.g., a laptop), may be moved to the site of the monitoring module 120 and be directly connected with the monitoring module 120. In this embodiment, computing unit 150 provides direct diagnostic and analysis capability to monitoring module 120 via this direct connection. In addition, in an exemplary embodiment, information in memory 135 may be accessed by a user of computing unit 150 via this direct connection.

Figure 2:
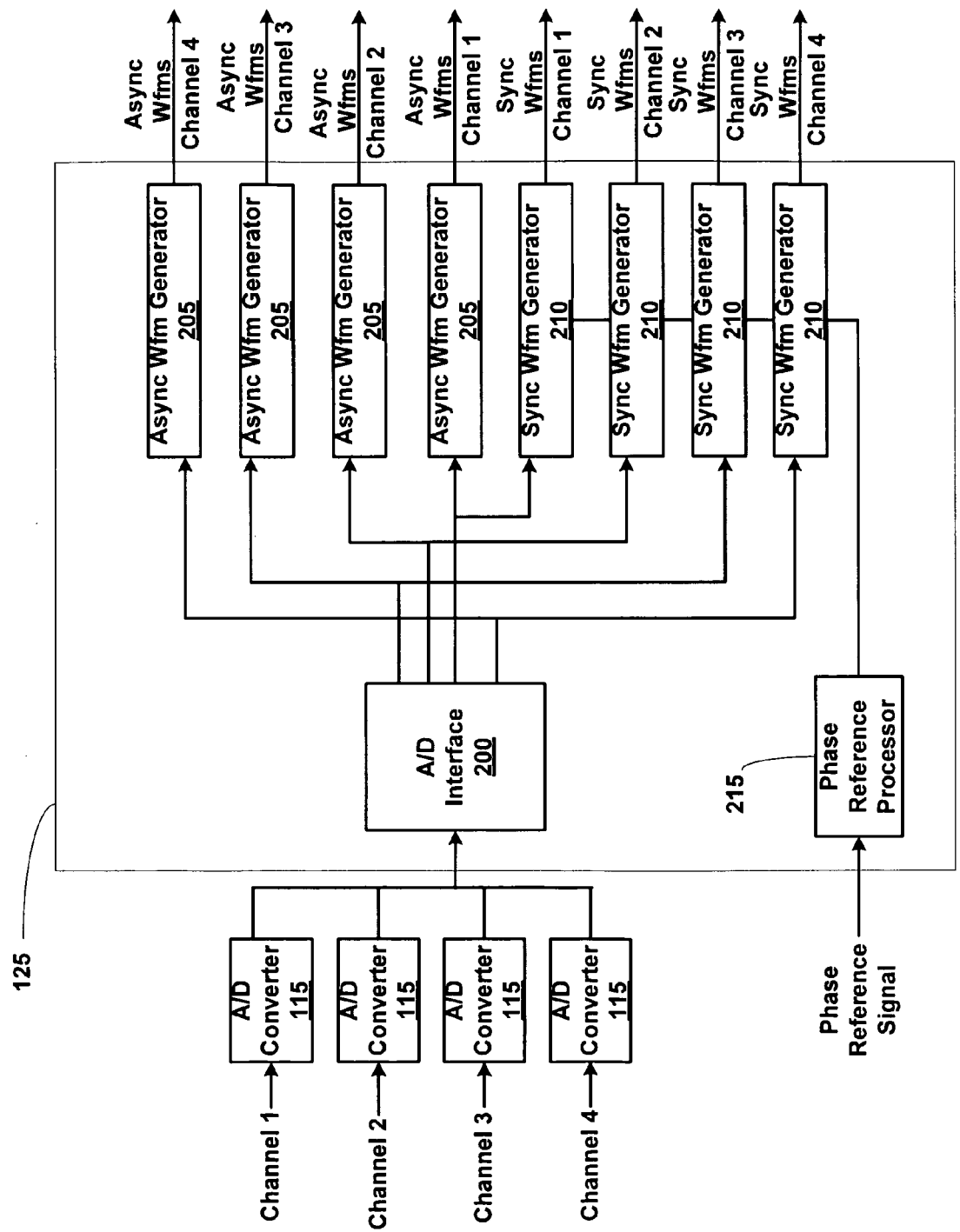
FIG. 2 is a schematic illustration of a first level signal processing component depicted in a monitoring module of FIG. 1 according to one embodiment of the present invention.

FIG. 2 is a schematic illustration of first level signal processing component 125 depicted in monitoring module 120 of FIG. 1 according to one embodiment of the present invention. As mentioned previously, first level signal processing component 125 signal processes data from A/D converters 115 by performing operations that include dynamic waveform decimation filtering and sample rate synchronization to an external timing signal. For monitoring machine condition measurements, the dynamic waveforms generated by the first level signal processing component 125 are processed simultaneously, synchronously, and in-phase across all channels. As shown in FIG. 2, there are four channels that provide the dynamic data from sensors 110 to A/D converter 115 although any number of sensors can be supported. In a preferred embodiment monitoring module 100 supports 12 channels. An A/D interface 200 receives the digital data from A/D converters 115 and provides it in parallel to an asynchronous waveform generator 205 and a synchronous waveform generator 210 for each respective channel. Asynchronous waveform generators 205 and synchronous waveform generators 210 create and synchronize waveforms from the dynamic data provided by channels 1-4. Synchronous waveform generators 210 are clocked to a phase reference signal provided by a phase reference processor 215. In one embodiment, the phase reference signal is related to the speed of machine 205. In another embodiment, multiple synchronous waveform generators 210 can be used to generate synchronous waveforms from different phase references for the same sensor signal 110. This is important when using casing mounted seismic sensors on machines with multiple shafts (such as gearboxes or aeroderivative gas turbines) where the influence of each shaft on the composite vibration signal is desired. In operation, asynchronous waveform generators 205 generate waveforms without regard to the phase reference signal, while synchronous waveform generators 210 generate waveforms that are in phase with the phase reference signal even through changing machine speed conditions. Note that asynchronous waveform generators 205 are still synchronized in time, maintain a constant sample rate and do not have an absolute phase reference.

As a result of the configuration shown in FIG. 2, first level signal processing component 125 is capable of generating a multitude of sampled waveforms such that all of these waveforms are available simultaneously in different sampled rates. This feature allows these waveforms to be used with any of measurements associated with the management operation of machine 105 or safety protection of machine 105. For example, if a user of monitoring system 100 currently uses one synchronized waveform rate (e.g., 32× the speed of machine 105) for diagnosing problems associated with machine 105 but has an interest in using a different synchronized waveform rate (e.g., 128×) to diagnose the problem, then this configuration is able to provide this data to the user. Below are details on how this multitude of waveforms generated by first level signal processing component 125 can be added, deleted or modified for use by second level signal processing component 130 in obtaining measurements associated with the management operation of machine 105 or safety protection of machine 105.

Figure 3:
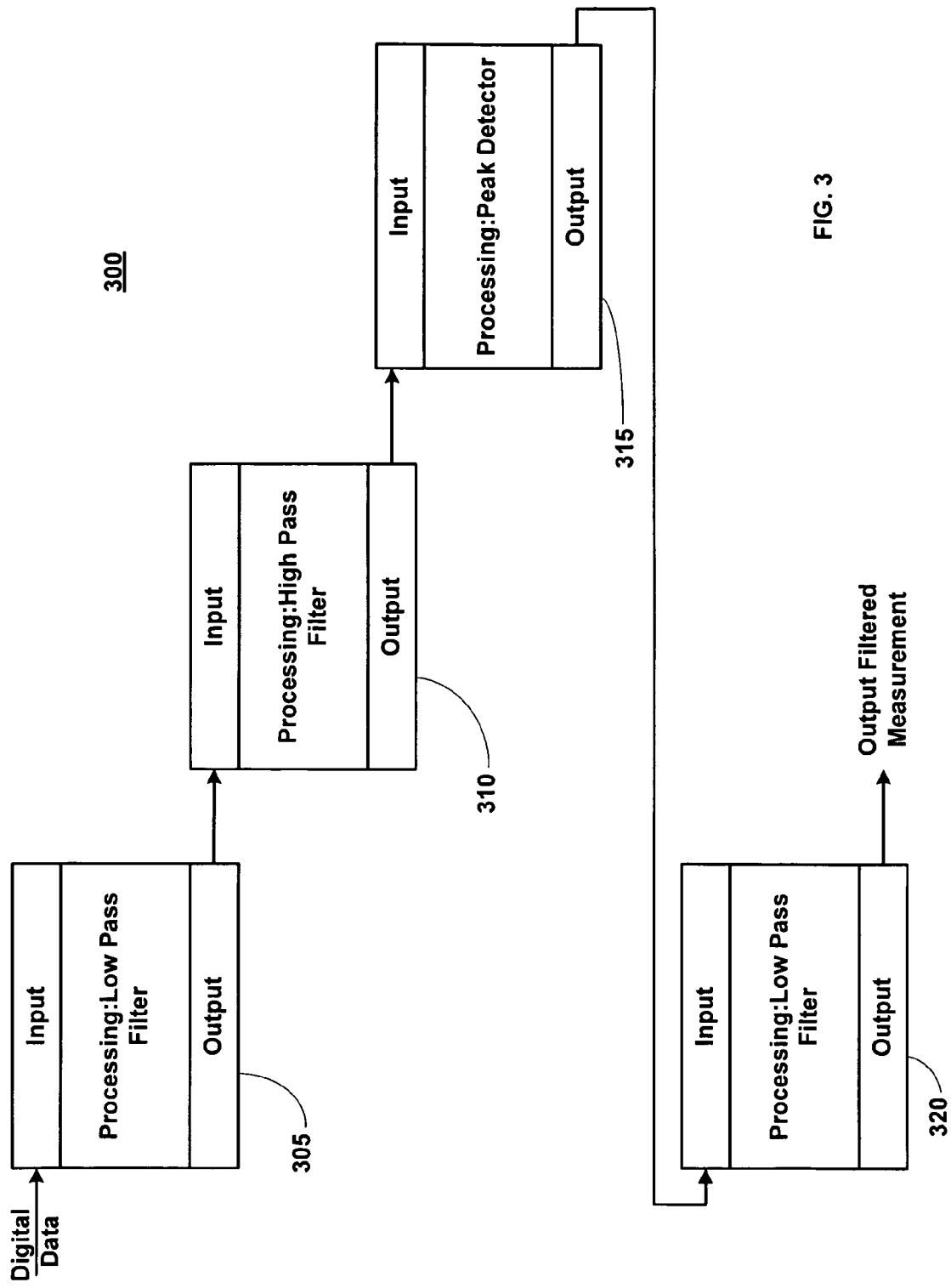
FIG. 3 is an example of a plurality of dynamically configurable signal processing blocks linked together to form a data path that defines a signal processing operation to be performed according to one embodiment of the present invention.

FIG. 3 is an example 300 of a plurality of dynamically configurable signal processing blocks linked together to form a data path that defines a signal processing operation to be performed according to one embodiment of the present invention. In this example, the dynamically configurable signal processing blocks include a processing block 305 that performs low pass filter processing, a processing block 310 that performs high pass filter processing, a processing block 315 that performs peak detection processing and a processing block 320 that performs low pass filter processing. In this example, a selected digital data stream (i.e., at least one waveform selected from the multitude of waveforms) is inputted to second level signal processing component 130 and fed into a data path that has been formed by the linkage of low pass filter processing block 305, high pass filter processing block 310, peak detector processing block 315 and low pass filter processing block 320. That is, a digital data stream output from first level signal processing component 125 is mapped to the input of the first signal processing block (i.e., low pass filter 305). The data moves from signal processing block to signal processing block by mapping the block outputs to the inputs of the next block. The output of the final processing block is then stored in a predefined memory location with memory 135 set by dB manager 140.

In the example illustrated in FIG. 3, this data path of linked signal processing blocks is representative of a particular measurement that is used for the safety protection of machine 105. In particular, each signal processing block generates values for a particular measurement, which is then used by the next subsequent signal processing block. Note that each signal processing block can have multiple signal paths linked to it.

Utilizing embodiments of this invention, this particular data path can be modified by a user of monitoring system 100 by adding another signal processing block to this path, deleting one of the signal processing blocks from the path and/or altering one of the signal processing blocks to generate a new output. This feature may be desirable to a user if for example the user wants to change the frequency span or sample rate. In this case, the user could dynamically configure this new data path by deleting a particular signal processing block from the data path and linking a new signal processing object that will pull the applicable waveform from the first level signal processing component 105 into this modified data path. This change can be made without interrupting the other signal processing blocks used in other signal paths that are employed by the second level signal processing component 130 to obtain measurements relating to the management operation and safety protection of the machine. This feature is quite advantageous in ensuring that data paths associated with the safety protection of machine 105 are not affected by changes made to signal processing blocks within data paths that relate to the management operation of machine 105 and vice versa. This feature is not possible in conventional machine condition monitoring systems because changes made to measurements related to the management operation of a machine will interfere with the measurements of the safety protection of the machine. Such interference would result in a shut down and resetting of the system to reconfigure such changes.

The data path of linked signal processing blocks shown in FIG. 3 is only illustrative of one possible data path that could be utilized by second level signal processing component 130. Those skilled in the art will recognize that second level signal processing component 130 would likely utilize a plurality of data paths having respective signal processing blocks to obtain measurements that relate to the management operation and safety protection of machine 105. Each of the signal processing blocks would be dynamically configurable to be linked such that any alterations made to the data paths would not interfere with other data paths utilized by second level signal processing component 130.

FIG. 4 is an example of an Extensible Markup Language (XML) file 400 used to define the signal processing operation depicted in FIG. 3. XML file 400 in this example describes how the signal processing blocks described in FIG. 3 are programmed to be configurably linked together such that the output of one block is fed into the next block. In this example, user configurable parameters can be changed for a given measurement regardless if the measurement relates to management operation or safety protection. The signal processing blocks are defined in metadata files in an XML format such that the signal processing block definitions may be changed without recompilation of the software. This architecture allows pre-defined measurements and custom designed and tested processing blocks to be added to monitoring module 120 without a software version change.

Starting at the bottom of the file, the Direct2.LP filter object receives its input directly from data stream PhysicalChannel__1__1. This filter object has elements that define the filter corner and roll off. The output of each object has destination objects that perform further operations on the data. There may be multiple destinations for an object output. In the example in FIG. 4, the data passes through a high pass filter object, followed by a peak detector and a low pass filter. The final result is a static variable. The static variable output can then be mapped for use in monitor rules or for output to controller 145 or computing unit 150.

In operation, this XML file is stored in memory 135 and once downloaded by second level processing component 130, the file is activated. If a user decides to delete a signal processing block then that particular portion of the XML file is removed. For example, if a user did not want the high pass filter signal processing block, then the Direct2.HP filter object would be deleted from this measurement data path and then the peak detector signal processing block (Direct2.PK) would be linked to the low pass filter signal processing block (Direct2.LP2). There would be no effect on other objects in this data path or any other signal blocks in other data paths that are associated with management operation measurements and/or safety protection measurements. The effect on other objects can be controlled by only downloading the changed objects, object revision codes, comparison of objects against the current objects or other techniques that can determine when objects have been added, deleted or changed.

In various embodiments of the present invention, monitoring module 120 can take the form of an entirely hardware embodiment, an entirely software embodiment or an embodiment containing both hardware and software elements. In one embodiment, the processing functions performed by monitoring module 120 are implemented in software, which includes but is not limited to firmware, resident software, microcode, etc.

Furthermore, the functions performed by monitoring module 120 can take the form of a computer program product accessible from a tangible-readable, computer-usable or computer-readable medium providing program code for use by or in connection with a processor, computer or any instruction execution system. For the purposes of this description, a tangible-readable, computer-usable or computer readable medium can be any apparatus that can contain, store or communicate the program for use by or in connection with the processor, computer, instruction execution system, apparatus, or device. The tangible-readable, computer-usable or computer readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A system for monitoring a machine, comprising:
   at least one sensor located about the machine that generates signals representative of a machine condition; and
   a monitoring module that monitors the signals generated from the at least one sensor, the monitoring module comprising:
      a first level signal processing component that generates a plurality of waveforms from the signals generated from the at least one sensor, each of the plurality of waveforms providing different frequency information and sample rates of the signals, wherein the first level signal processing component comprises a plurality of asynchronous waveform generators in parallel with a plurality of synchronous waveform generators clocked to a phase reference signal, the plurality of asynchronous waveform generators and the plurality of synchronous waveform generators each creating and synchronizing waveforms that collectively form the plurality of waveforms, wherein the plurality of asynchronous waveform generators generate waveforms without regard to the phase reference signal and the plurality of synchronous waveform generators generate waveforms that are in phase with the phase reference signal, the plurality of waveforms generated from the plurality of asynchronous waveform generators and the plurality of asynchronous waveform generators include waveforms synchronized with different sample rates configured to be made simultaneously available at the different sample rates; and
      a second level signal processing component comprising a plurality of signal processing blocks that are dynamically configurable to be linked to form at least one data path that defines a signal processing operation to be performed on at least one waveform selected from the plurality of waveforms generated from the first level signal processing component to determine at least one measurement relating to the management of the operation of the machine and at least one data path that defines a signal processing operation to be performed on at least one waveform selected from the plurality of waveforms generated from the first level signal processing component to determine at least one measurement relating to the safety protection of the machine, wherein configurability of measurements relating to the management of the operation of the machine is independent and non-interfering with the configurability of measurements relating to the safety protection of the machine.

2. The system according to claim 1, wherein the monitoring module further comprises an analog-to-digital converter that converts the signals generated from the at least one sensor to sampled digital signals.

3. The system according to claim 1, wherein the first level signal processing component is selected from the group consisting of a field programmable gate array, a programmable logic device, a complex programmable logic device, an application specific integrated circuit and a processor.

4. The system according to claim 1, wherein each of the dynamically configurable plurality of signal processing blocks in the second level signal processing component are modifiable to be added, altered or deleted without affecting other signal processing blocks used in other data paths that generate measurements relating to management of the operation of the machine and the safety protection of the machine.

5. The system according to claim 1, wherein the second level signal processing component comprises a signal processor.

6. The system according to claim 1, wherein the monitoring module further comprises memory configured to store measurements relating to the management of the operation of the machine and the safety protection of the machine.

7. The system according to claim 6, wherein the monitoring module further comprises a database manager that allocates predetermined locations in memory to store the measurements.

8. The system according to claim 6, wherein the memory is configured to store the dynamically configurable plurality of signal processing blocks.

9. The system according to claim 8, wherein the second level signal processing component is configured to map the at least one waveform selected from the plurality of waveforms generated from the first level signal processing component to selected signal processing blocks that define the at least one data path.

10. A method, performed on a processing system, for monitoring a machine, comprising:
    using the processing system to perform actions including:
       obtaining raw data representative of a condition occurring at a machine;
       generating a plurality of waveforms from the raw data, wherein each of the plurality of waveforms depict a visual representation having different frequency information of the raw data, the generating of the plurality of waveforms comprising using a plurality of asynchronous waveform generators in parallel with a plurality of synchronous waveform generators clocked to a phase reference signal, the plurality of asynchronous waveform generators and the plurality of synchronous waveform generators each creating and synchronizing waveforms that collectively form the plurality of waveforms, wherein the plurality of asynchronous waveform generators generate waveforms without regard to the phase reference signal and the plurality of synchronous waveform generators generate waveforms that are in phase with the phase reference signal, the plurality of waveforms generated from the plurality of asynchronous waveform generators and the plurality of asynchronous waveform generators include waveforms synchronized with different sample rates configured to be made simultaneously available at the different sample rates; and
       dynamically configuring a plurality of signal processing blocks to be linked to form at least one data path that defines a signal processing operation to be performed on at least one waveform selected from the plurality of waveforms to determine at least one measurement relating to the management of the operation of the machine and at least one measurement relating to the safety protection of the machine, without interfering with signal processing blocks used in other data paths that determine measurements relating to the management of the operation of the machine and other data paths that determine measurements relating to the safety protection of the machine.

11. The method according to claim 10, further comprising converting the raw data to digital signals.

12. The method according to claim 10, wherein the dynamically configuring of the plurality of signal processing blocks comprising modifying the plurality of signal processing blocks to be added, altered or deleted without affecting other signal processing blocks used in other data paths that generate measurements relating to management of the operation of the machine and the safety protection of the machine.

13. The method according to claim 10, further comprising storing measurements relating to the management of the operation of the machine and the safety protection of the machine.

14. The method according to claim 10, further comprising storing the dynamically configurable plurality of signal processing blocks.

15. The method according to claim 10, further comprising mapping the at least one waveform selected from the plurality of waveforms to selected signal processing blocks that define the at least one data path.

16. A tangible-readable medium storing instructions, which when executed, enables a processor to monitor a machine, the instructions causing the processor to perform actions comprising:

obtaining signals representative of a machine condition;

generating a plurality of waveforms from the signals, wherein each of the plurality of waveforms provides different frequency information of the signals, the generating of the plurality of waveforms comprising using a plurality of asynchronous waveform generators in parallel with a plurality of synchronous waveform generators clocked to a phase reference signal, the plurality of asynchronous waveform generators and the plurality of synchronous waveform generators each creating and synchronizing waveforms that collectively form the plurality of waveforms, wherein the plurality of asynchronous waveform generators generate waveforms without regard to the phase reference signal and the plurality of synchronous waveform generators generate waveforms that are in phase with the phase reference signal, the plurality of waveforms generated from the plurality of asynchronous waveform generators and the plurality of asynchronous waveform generators include waveforms synchronized with different sample rates configured to be made simultaneously available at the different sample rates; and dynamically configuring a plurality of signal processing blocks to be linked to form at least one data path that defines a signal processing operation to be performed on at least one waveform selected from the plurality of waveforms to determine at least one measurement relating to the management of the operation of the machine and at least one measurement relating to the safety protection of the machine, without interfering with signal processing blocks used in other data paths that determine measurements relating to the management of the operation of the machine and other data paths that determine measurements relating to the safety protection of the machine.

17. The tangible-readable medium according to claim 16, wherein the dynamically configuring of the plurality of signal processing blocks comprises modifying the plurality of signal processing blocks to be added, altered or deleted without affecting other signal processing blocks used in other data paths that generate measurements relating to management of the operation of the machine and the safety protection of the machine.

18. The tangible-readable medium according to claim 16, further comprising instructions that cause the processor to store measurements relating to the management of the operation of the machine and the safety protection of the machine.

19. The tangible-readable medium according to claim 16, further comprising instructions that cause the processor to store the dynamically configurable plurality of signal processing blocks.

20. The tangible-readable medium according to claim 16, further comprising instructions that cause the processor to map the at least one waveform selected from the plurality of waveforms to selected signal processing blocks that define the at least one data path.

\* \* \* \* \*